(12) United States Patent
Shen et al.

(10) Patent No.: US 11,963,115 B2
(45) Date of Patent: Apr. 16, 2024

(54) INFORMATION RECEIVING METHOD, INFORMATION SENDING METHOD, TERMINAL, AND NETWORK-SIDE DEVICE

(71) Applicant: VIVO MOBILE COMMUNICATION CO., LTD., Chang'an Dongguan (CN)

(72) Inventors: Xiaodong Shen, Chang'an Dongguan (CN); Siqi Liu, Chang'an Dongguan (CN); Yu Ding, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 356 days.

(21) Appl. No.: 17/361,566

(22) Filed: Jun. 29, 2021

(65) Prior Publication Data

US 2021/0337490 A1     Oct. 28, 2021

Related U.S. Application Data

(63) Continuation of application No. PCT/CN2019/128522, filed on Dec. 26, 2019.

(30) Foreign Application Priority Data

Dec. 29, 2018   (CN) .......................... 201811646619.4

(51) Int. Cl.
*H04W 56/00* (2009.01)
*H04W 24/08* (2009.01)
(Continued)

(52) U.S. Cl.
CPC ......... *H04W 56/001* (2013.01); *H04W 24/08* (2013.01); *H04W 72/0446* (2013.01); *H04W 72/1263* (2013.01)

(58) Field of Classification Search
None
See application file for complete search history.

(56) References Cited

U.S. PATENT DOCUMENTS

| 11,388,686 B2* | 7/2022 | Harada ................. H04W 24/10 |
| 2020/0196306 A1* | 6/2020 | Si ............................ H04L 5/001 |

(Continued)

FOREIGN PATENT DOCUMENTS

| CN | 108199819 A | 6/2018 |
| CN | 108684077 A | 10/2018 |

(Continued)

OTHER PUBLICATIONS

Japanese Notice of Reasons for Refusal for related Application No. 2021-538025; dated Jul. 28, 2022.

(Continued)

*Primary Examiner* — Otis L Thompson, Jr.
(74) *Attorney, Agent, or Firm* — von Briesen & Roper, s.c.

(57) ABSTRACT

This disclosure provides an information receiving method, an information sending method, a terminal, and a network-side device. The information receiving method includes: performing SSB detection; determining, based on transmission configuration information for first information, a candidate SSB set quasi co-located with a detected first SSB, where the first information includes an SSB; and performing first processing based on the first SSB and the candidate SSB set, where the first processing includes one of the following: receiving system information scheduled by a physical control channel associated with the first SSB; performing radio link monitoring; and performing radio resource management measurement.

19 Claims, 11 Drawing Sheets

(51) Int. Cl.
*H04W 72/0446* (2023.01)
*H04W 72/1263* (2023.01)

(56) References Cited

U.S. PATENT DOCUMENTS

| | | | |
|---|---|---|---|
| 2020/0280418 A1* | 9/2020 | Gao | H04W 72/23 |
| 2021/0084623 A1 | 3/2021 | Zhang et al. | |
| 2021/0136710 A1 | 5/2021 | Li et al. | |
| 2021/0297968 A1* | 9/2021 | Alriksson | H04L 5/0091 |

FOREIGN PATENT DOCUMENTS

| | | |
|---|---|---|
| CN | 108886462 A | 11/2018 |
| CN | 109041250 A | 12/2018 |
| CN | 109076378 A | 12/2018 |
| EP | 3738361 | 11/2020 |
| EP | 3758260 A1 | 12/2020 |
| WO | 2018129300 A1 | 7/2018 |
| WO | 2018171379 A1 | 9/2018 |
| WO | 2019160331 A1 | 8/2019 |

OTHER PUBLICATIONS

Qualcomm Incorporated, "Initial access and mobility procedures for NR unlicensed", Nov. 12-16, 2018, 3GPP TSG RAN WG1 Meeting #95, Spokane, USA, R1-1813414.
Qualcomm Incorporated; "Initial access and mobility procedures for NR unlicensed", 3GPP TSG RAN WG1 Meeting #94bis, Chengdu, China, Oct. 8-12, 2018, R1-1811253.
International Search Report and Written Opinion related to PCT/CN2019/128522; dated Mar. 27, 2020.
First Office Action related to Chinese Application No. 201811646619.4; dated Jan. 12, 2021.
Extended European Search Report for related Application No. 19902327.6; dated Jan. 26, 2022.
R1-1812561—Source—LG Electronics "Initial Access and Mobility for NR Unlicensed Operation", Agenda Item: 7.2.2.4.2, Document for: Discussion and decision, 3GPP TSG RAN WG1 Meeting #95, Spokane, USA, Nov. 12-16, 2018.
R1-1813459—Source—Ericsson "On Initial Access, Mobility and RLM", Agenda Item: 7.2.2.4.2, Document for: Discussion, Decision, 3GPP TSG RAN WG1 Meeting #95, Spokane, USA, Nov. 12-16, 2018.

* cited by examiner

INFORMATION RECEIVING METHOD, INFORMATION SENDING METHOD, TERMINAL, AND NETWORK-SIDE DEVICE

CROSS-REFERENCE TO RELATED APPLICATIONS

This application is a continuation application of a PCT Application No. PCT/CN2019/128522 filed on Dec. 26, 2019, which claims priority to Chinese Patent Application No. 201811646619.4 filed in China on Dec. 29, 2018, which is incorporated herein by reference in its entirety.

TECHNICAL FIELD

Embodiments of this disclosure relate to the field of wireless communications technologies, and in particular, to an information receiving method, an information sending method, a terminal, and a network-side device.

BACKGROUND

In a Fifth Generation (5G) communications system, configuration information of a physical control channel (Type 0 PDCCH) for scheduling system information is sent in a synchronization signal/physical broadcast channel signal block (SS/PBCH block, or SSB). For sub-6 GHz bands, multiplexing pattern 1 is employed for SSB/PBCH and type 0 PDCCH resources, which means that the SSB/PBCH and type 0 PDCCH cannot overlap in time domain. In this mode, a terminal may monitor the type 0 PDCCH in the $n_0^{th}$ slot, where $n_0$ satisfies the following condition:

For an SSB with index i, $n_0 = (O \cdot 2^\mu + \lfloor i \cdot M \rfloor) \bmod N_{slot}^{frame,\mu}$; and if $\lfloor (O \cdot 2^\mu + \lfloor i \cdot M \rfloor)/N_{slot}^{frame,\mu} \rfloor \bmod 2 = 0$, the type 0 PDCCH is located in an even frame; or if $\lfloor (O \cdot 2^\mu + \lfloor i \cdot M \rfloor)/N_{slot}^{frame,\mu} \rfloor \bmod 2 = 1$, the type 0 PDCCH is located in an odd frame, where $\mu$ is a subcarrier spacing.

Values of M and O in the foregoing formula are given in Table 1:

TABLE 1

Configuration for type 0 PDCCH

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {$N_{symb}^{CORESET}$, if i is odd} |
| 2 | 2 | 1 | 1 | 0 |
| 3 | 2 | 2 | 1/2 | {0, if i is even}, {$N_{symb}^{CORESET}$, if i is odd} |
| 4 | 5 | 1 | 1 | 0 |
| 5 | 5 | 2 | 1/2 | {0, if i is even}, {$N_{symb}^{CORESET}$, if i is odd} |
| 6 | 7 | 1 | 1 | 0 |
| 7 | 7 | 2 | 1/2 | {0, if i is even}, {$N_{symb}^{CORESET}$, if i is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

Therefore, in a 5G licensed system, as long as configuration indexes (that is, indexes 0 to 15) are determined, type 0 PDCCHs associated with each SSB are monitored on fixed slots based on periodicity in time domain.

When a communications system runs on an unlicensed band, before sending information, a terminal or a network device needs to perform clear channel assessment (CCA) or extended clear channel assessment (eCCA) to monitor channels, that is, perform energy detection (ED). When energy is lower than a threshold, transmission can start only when the channel is determined to be clear. Because an unlicensed band is shared by a plurality of technologies or a plurality of transmission points, this contention-based access mode causes uncertainty of available time of a channel. When the channel is available, an available transmission occasion for a network side signal may have been missed and transmission cannot be performed. Consequently, a receive end possibly cannot normally receive signals as configured by the network side and cannot perform terminal behavior as expected by the configuration of the network side after receiving a signal, for example, PDCCH monitoring, and radio environment monitoring and measurement.

Therefore, in an unlicensed-band communications system, how the network side sends information and how the terminal receives information are technical problems urgently to be resolved.

SUMMARY

Embodiments of this disclosure provide an information receiving method, an information sending method, a terminal, and a network-side device, to resolve a problem about how a network side sends information and how a terminal receives information in an unlicensed communications system.

To resolve the foregoing technical problem, this disclosure is implemented as follows:

According to a first aspect, an embodiment of this disclosure provides an information receiving method, applied to a terminal, where the method includes:

performing SSB detection;
determining, based on transmission configuration information for first information, a candidate SSB set quasi co-located with a detected first SSB, where the first information includes an SSB; and
performing first processing based on the first SSB and the candidate SSB set, where the first processing includes one of the following:
receiving system information scheduled by a physical control channel associated with the first SSB;
performing radio link monitoring; and
performing radio resource management measurement.

According to a second aspect, an embodiment of this disclosure provides an information sending method, applied to a network-side device, where the method includes:

performing clear channel detection in a candidate transmission time window, where the candidate transmission time window is a time window for transmitting first information; and
sending the first information on a detected clear channel based on transmission configuration information for the first information, where the first information includes an SSB, and the SSB carries the transmission configuration information.

According to a third aspect, an embodiment of this disclosure provides a terminal, including:

a detection module, configured to perform SSB detection;
a determining module, configured to determine, based on transmission configuration information for first information, a candidate SSB set quasi co-located with a detected first SSB, where the first information includes an SSB; and an execution module, configured to perform first processing based on the first SSB and the candidate SSB set, where the first processing includes one of the following:

receiving system information scheduled by a physical control channel associated with the first SSB;

performing radio link monitoring; and performing radio resource management measurement.

According to a fourth aspect, an embodiment of this disclosure provides a network-side device, including:

a clear channel detection module, configured to perform clear channel detection in a candidate transmission time window, where the candidate transmission time window is a time window for transmitting first information; and a sending module, configured to send the first information on a detected clear channel based on transmission configuration information for the first information, where the first information includes an SSB, and the SSB carries the transmission configuration information.

According to a fifth aspect, an embodiment of this disclosure provides a terminal, including a processor, a memory, and a computer program stored in the memory and capable of running on the processor, where when the computer program is executed by the processor, the steps of the foregoing information receiving method are implemented.

According to a sixth aspect, an embodiment of this disclosure provides a network-side device, including a processor, a memory, and a computer program stored in the memory and capable of running on the processor, where when the computer program is executed by the processor, the steps of the foregoing information sending method are implemented.

According to a seventh aspect, an embodiment of this disclosure provides a computer-readable storage medium, where the computer-readable storage medium stores a computer program, and when the computer program is executed by a processor, steps of the foregoing information receiving method are implemented, or steps of the foregoing information sending method are implemented.

In the embodiments of this disclosure, when sending the SSB, the network-side device may use the SSB to carry the transmission configuration information for the first information; and based on the transmission configuration information, the terminal receives the system information scheduled by the physical control channel, and performs radio link monitoring, or performs radio resource management measurement. Because the transmission configuration information may be carried by the SSB, a search space for the physical control channel associated with the SSB can be configured flexibly.

BRIEF DESCRIPTION OF DRAWINGS

A person of ordinary skill in the art will be clear about other advantages and benefits by reading the following detailed description of optional embodiments. The accompanying drawings are merely intended to illustrate the objectives of the optional embodiments and are not intended to limit this disclosure. Throughout the accompanying drawings, same reference numerals represent same components.

DESCRIPTION OF EMBODIMENTS

The following clearly describes the technical solutions in the embodiments of this disclosure with reference to the accompanying drawings in the embodiments of this disclosure. Apparently, the described embodiments are merely a part rather than all of the embodiments of this disclosure. All other embodiments that a person of ordinary skill in the art obtains without creative efforts based on the embodiments of this disclosure shall fall within the protection scope of this disclosure.

In the specification and claims of this application, the term "including", and any other variant thereof mean to cover a non-exclusive inclusion. For example, a process, method, system, product, or device that includes a list of steps or units is not necessarily limited to those steps or units, but may include other steps or units not expressly listed or inherent to such a process, method, system, product, or device. In addition, the term "and/or" used in the specification and claims indicates at least one of connected objects. For example, "A and/or B" represents the following three cases: Only A exists, only B exists, and both A and B exist.

In the embodiments of this disclosure, terms such as "an example" or "for example" are used to represent an example, an instance, or an illustration. Any embodiment or design solution described as "an example" or "for example" in the embodiments of this disclosure shall not be interpreted to be more preferential or advantageous than other embodiments or design solutions. Specifically, the terms such as "an example" or "for example" are intended to present related concepts in a specific manner.

The following describes the embodiments of this disclosure with reference to the accompanying drawings. The information receiving method, information sending method, terminal, and network-side device according to the embodiments of this disclosure may be applied to a wireless communications system. The wireless communications system may be a 5G system, or an evolved long term evolution (eLTE) system, or a later evolved communications system.

Figure 1:
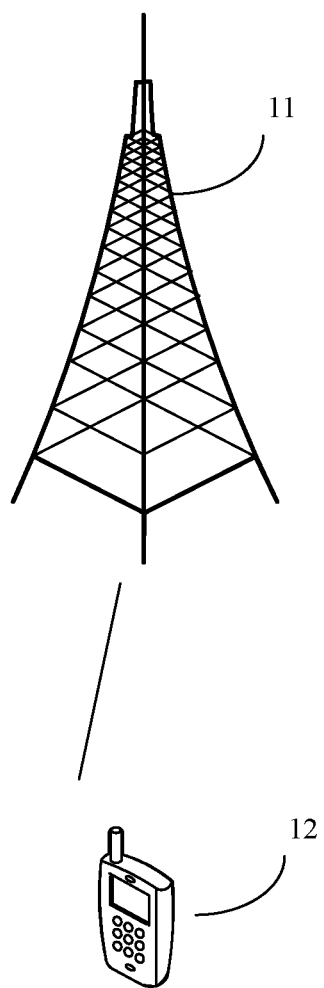
FIG. 1 is a schematic architectural diagram of a wireless communications system according to an embodiment of this disclosure.

FIG. 1 is a schematic architectural diagram of a wireless communications system according to an embodiment of this disclosure. As shown in FIG. 1, the wireless communications system may include a network-side device 11 and a terminal 12. The terminal 12 may be connected to the network-side device 11. In an actual application, a connection between the foregoing devices may be a wireless connection. To conveniently and visually represent a connection relationship between the devices, a solid line is used in FIG. 1.

It should be noted that the foregoing communications system may include a plurality of terminals 12 and that the network-side device 11 may communicate with the plurality of terminals 12 (transmitting signaling or data).

The network-side device 11 provided by this embodiment of this disclosure may be a base station. The base station may be a generally used base station, or may be an evolved node base station (eNB), or may be a device such as a network-side device (for example, a next generation base station (gNB) or a transmission and reception point (TRP)) or a cell in a 5G system, or may be a network-side device in a later evolved communications system. The terms do not constitute any limitation.

The terminal 12 provided by this embodiment of this disclosure may be a mobile phone, a tablet computer, a notebook computer, an ultra-mobile personal computer (UMPC), a netbook, a personal digital assistant (PDA), or the like. A person skilled in the art may understand that the terms do not constitute any limitation.

Figure 2:
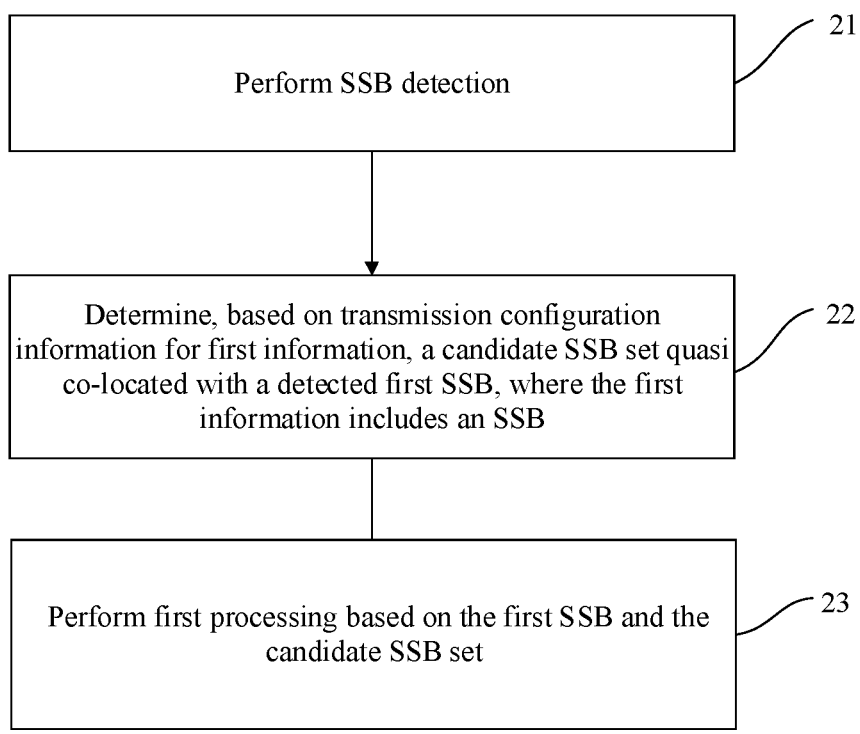
FIG. 2 is a schematic flowchart of an information receiving method according to an embodiment of this disclosure.

FIG. 2 is a schematic flowchart of an information receiving method according to an embodiment of this disclosure. The method is applied to a terminal and includes the following steps.

Step 21: Perform SSB detection.

Step 22: Determine, based on transmission configuration information for first information, a candidate SSB set quasi co-located with a detected first SSB, where the first information includes an SSB.

Step 23: Perform first processing based on the first SSB and the candidate SSB set, where the first processing includes one of the following:

receiving system information scheduled by a physical control channel associated with the first SSB;
performing radio link monitoring; and
performing radio resource management measurement.

In this embodiment of this disclosure, a search space for a physical control channel, configured by using an SSB and located in a same slot as the SSB, is referred to as a first search space for the physical control channel associated with the SSB. For example, referring to FIG. 3, in FIG. 3, a first search space for a physical control channel associated with SSB #0 is search space 200 that is in a same slot as SSB #0 and is located before SSB #0 and filled with same stripes as SSB #0; and a first search space for a physical control channel associated with SSB #1 is search space 200 that is in a same slot as SSB #1 and is located before SSB #1 and filled with same stripes as SSB #1.

A first search space for a physical control channel associated with a detected first SSB and a first search space for a physical control channel associated with a detected candidate SSB are collectively referred to as a search space for a physical control channel associated with the first SSB.

In this embodiment of this disclosure, the physical control channel may be a type 0 PDCCH.

The method in this embodiment of this disclosure may be applied to an unlicensed communications system.

In the unlicensed communications system, all of the SSB, the physical control channel associated with the SSB, and system information scheduled by the physical control channel can be sent only after clear channel assessment is performed. In the unlicensed communications system, the signals are generally sent together, for example, by using a cell discovery signal (DRS), so that the information is sent more efficiently. In this way, all the broadcast signals can be successfully sent by performing clear channel detection only once. In addition, because the information is important, to ensure a probability of transmitting the information, a plurality of candidate positions need to be introduced in a candidate transmission time window (such as a DRS window).

In this embodiment of this disclosure, the first information may be a DRS.

In this embodiment of this disclosure, the terminal receives, based on the transmission configuration information for the first information, carried by the SSB, or the transmission configuration information prescribed by a protocol, the system information scheduled by the physical control channel associated with the detected SSB, or performs radio link monitoring, or performs radio resource management measurement. Because the configuration information may be carried by the SSB, the first search space for the physical control channel associated with the SSB can be configured flexibly.

In this embodiment of this disclosure, the transmission configuration information includes at least one of the following:

information 1: positions of SSBs and positions of first search spaces for physical control channels associated with the SSBs in a slot;

information 2: the number n of search spaces for physical control channels in one slot, where n is a positive integer greater than or equal to 1;

information 3: a period T of a candidate transmission time window;

information 4: a length L of a candidate transmission time window;

information 5: a quasi co-location factor q for SSBs in a candidate transmission time window; and information 6: the number and/or positions of SSBs sent in one slot, where the candidate transmission time window is a time window for transmitting the first information.

The information may be carried by the SSB or prescribed by a protocol, or partially carried by the SSB and partially prescribed by a protocol.

Optionally, q may be the maximum number of SSBs not having a quasi co-location relationship in the candidate transmission time window.

In this embodiment of this disclosure, the information 1 (positions of SSBs and positions of first search spaces for physical control channels associated with the SSBs in a slot) may be carried by the first SSB, or may be prescribed by a protocol.

In this embodiment of this disclosure, the information 2 (the number n of search spaces for physical control channels in one slot) may be carried by the first SSB. Therefore, different values of n may be configured based on different situations. Optionally, the value of n may be 1 or 2.

Figure 3:
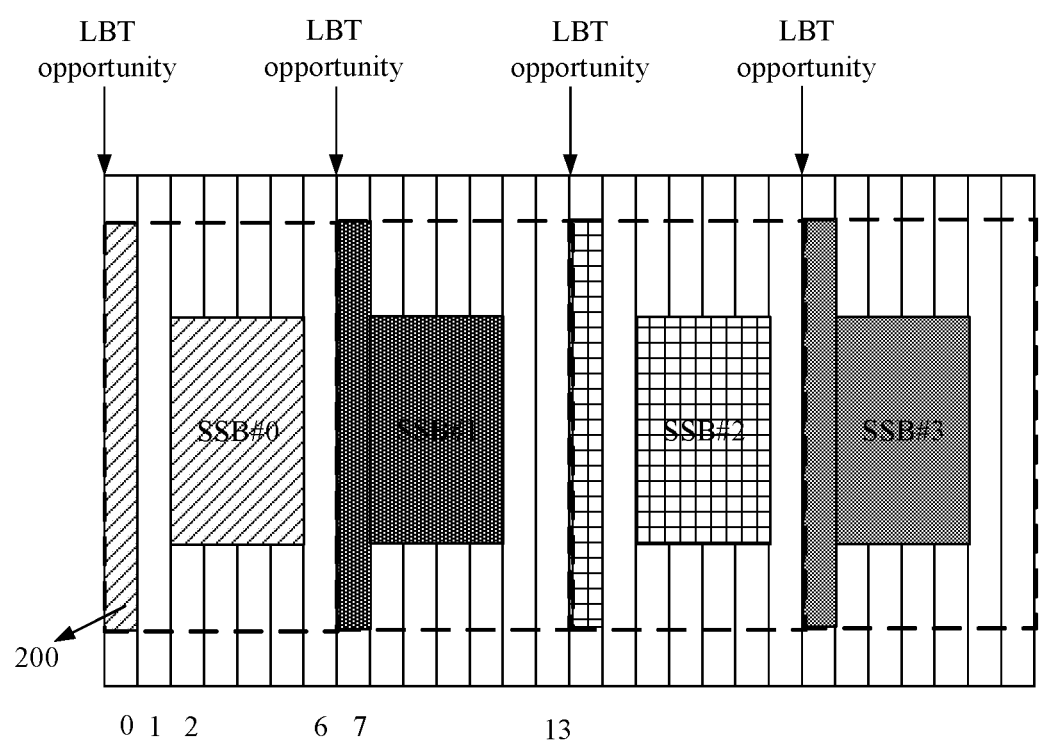
FIG. 3 is a schematic diagram of an information sending mode according to an embodiment of this disclosure.
Figure 4:
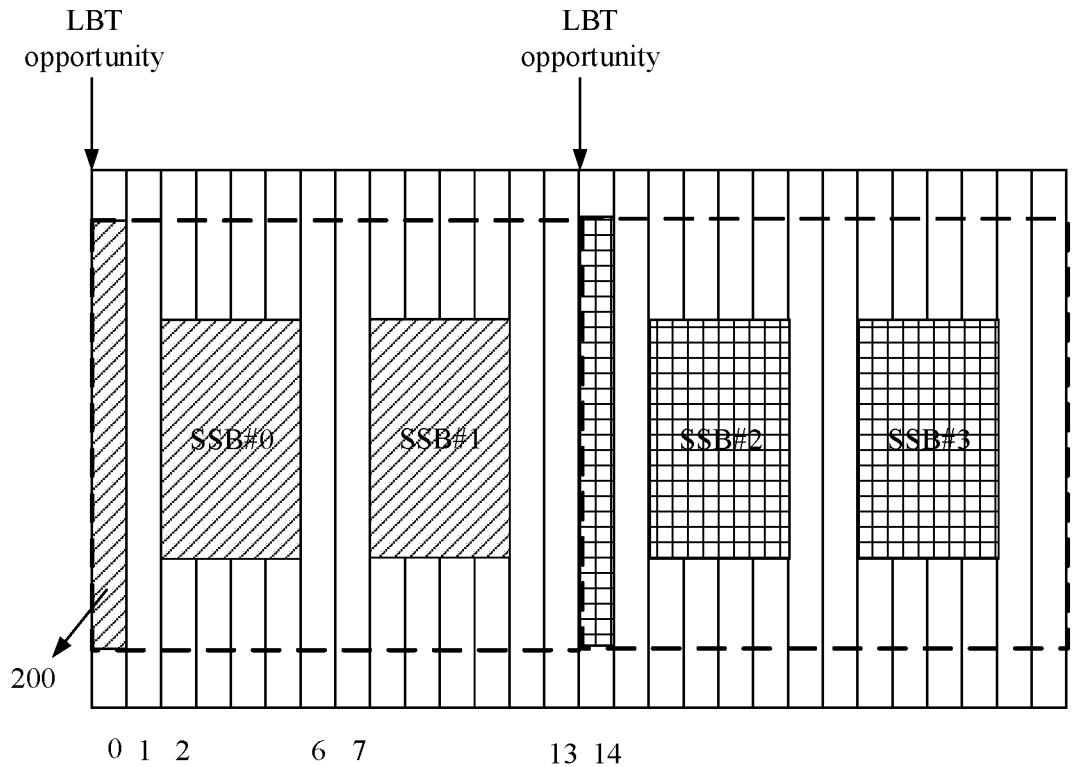
FIG. 4 is a schematic diagram of another information sending mode according to an embodiment of this disclosure.

In this embodiment of this disclosure, the information 2 may be determined based on a size of the system information. If the size of the system information is less than a threshold, two search spaces for physical control channels may be configured in a slot. Referring to FIG. 3, in the embodiment shown in FIG. 3, two search spaces 200 for physical control channels are configured in one slot (for example, symbols 0-13). If the size of the system information is greater than a threshold, one search space for a physical control channel may be configured in a slot. Referring to FIG. 4, in the embodiment shown in FIG. 4, one search space 200 for a physical control channel is configured in one slot (for example, symbols 0-13).

In this embodiment of this disclosure, the information 3 (a period T of a candidate transmission time window) may be prescribed by a protocol, or may be carried by the first SSB, and when the information 3 is carried by the first SSB, different values of T may be configured based on different situations.

In this embodiment of this disclosure, the information 4 (a length L of a candidate transmission time window) may be prescribed by a protocol, or may be carried by the first SSB, and when the information 4 is carried by the first SSB, different values of L may be configured based on different situations.

In this embodiment of this disclosure, the information 5 may be carried by the first SSB, and therefore, different values of q may be configured based on different situations.

In this embodiment of this disclosure, the information 6 (the number and/or positions of SSBs sent in one slot) may be carried by the first SSB, and therefore may be configured based on different situations. For example, one SSB sent in one slot is configured, or two SSBs sent in one slot are configured. Referring to FIG. 3, in the embodiment shown in FIG. 3, two SSBs are sent in one slot (for example, symbols 0-13).

In this embodiment of this disclosure, optionally, for different frequencies (for example, an FR1 and an FR2), different subcarrier spacings (for example, 30 kHz and 60 kHz), or different maximum numbers (that is, maximum values of SSB indexes) of candidate SSBs, the configuration information may be different.

In this embodiment of this disclosure, the step 22 (determining, based on the transmission configuration information, a candidate SSB set quasi co-located with a detected first SSB) may include:

Step 221: Determine a candidate transmission time window set based on the transmission configuration information and an index i of the first SSB, where the candidate transmission time window is the time window for transmitting the first information.

Step 222: Determine, in the candidate transmission time window set, a position of the candidate SSB set quasi co-located with the first SSB.

In some embodiments of this disclosure, the foregoing step 221 (the determining a candidate transmission time window set based on the transmission configuration information and an index i of the first SSB) may include:

Step 2211: Calculate, based on the index i of the first SSB, a start position t0 of a candidate transmission time window.

Step 2212: Determine the candidate transmission time window set based on the start position of the candidate transmission time window corresponding to the first SSB, a period T of the candidate transmission time window, and a length L of the candidate transmission time window.

In some embodiments of this disclosure, the start position t0 of the candidate transmission time window corresponding to the first SSB may be calculated based on the following formula:

$$\begin{cases} t_0 = t_c - \left(14 * \left\lfloor \frac{i}{2} \right\rfloor + 2\right) * t_s, \text{ if } i_0 \text{ is even} \\ t_0 = t_c - \left(14 * \left\lfloor \frac{i}{2} \right\rfloor + 8\right) * t_s, \text{ if } i_0 \text{ is odd} \end{cases}$$

where i is the index of the first SSB, $t_c$ is a sending position of the first SSB, and $t_s$ is a symbol length.

In some embodiments of this disclosure, the candidate transmission time window $W_0$ may be calculated based on the following formula:

$$W_0 = [t_0 + m*T, t_0 + m*T + L]$$

where m=0, 1, 2, . . . , T is the period of the candidate transmission time window, and L is the length of the candidate transmission time window.

In some embodiments of this disclosure, the foregoing step 222 (the determining, in the candidate transmission time window set, a position of the candidate SSB set quasi co-located with the first SSB) includes:

Step 2221: Determine an index of the candidate SSB set based on the index i of the first SSB, the number n of search spaces for physical control channels in one slot, and the quasi co-location factor q for SSBs in the candidate transmission time window.

Step 2222: Determine the position of the candidate SSB set in the candidate transmission time window set based on the index of the candidate SSB set.

In some embodiments of this disclosure, the index $i_0$ of the candidate SSB set satisfies: $\lfloor i*n/2 \rfloor \bmod q = \lfloor i_0*n/2 \rfloor \bmod q$.

In some embodiments of this disclosure, the first information further includes a physical control channel associated with the SSB and system information scheduled by the physical control channel.

In some embodiments of this disclosure, the foregoing step 23 (the receiving system information scheduled by a physical control channel associated with the first SSB) may include:

Step 231: Determine, based on the positions of SSBs and positions of first search spaces for physical control channels associated with the SSBs in a slot, a first search space for the physical control channel associated with the first SSB, and a candidate first search space group for physical control channels associated with the candidate SSB set.

Step 232: Perform detection for the candidate first search space group in the candidate transmission time window set.

Step 233: Determine the first search space for the physical control channel associated with the first SSB and a detected candidate first search space group as search spaces for the physical control channel associated with the first SSB.

Step 234: Receive, in a slot in which the search spaces for the physical control channel associated with the first SSB are located, the system information scheduled by the physical control channel associated with the first SSB.

In this embodiment of this disclosure, first, the candidate SSB set quasi co-located with the detected first SSB is determined based on the detected first SSB; then the first search space for the physical control channel associated with the first SSB, and candidate first search spaces for the physical control channels associated with the candidate SSB set are determined; detection is performed for the candidate first search spaces; the first search space for the physical control channel associated with the first SSB and the detected candidate first search space group are determined as the search space for the physical control channel associated with the first SSB; and the system information scheduled by the physical control channel associated with the first SSB is received in the slot in which the search space for the physical control channel associated with the first SSB is located.

In other embodiments of this disclosure, the foregoing step 23 (the receiving system information scheduled by a physical control channel associated with the first SSB) may include:

a determining step 231': determining, based on the positions of SSBs and positions of first search spaces for physical control channels associated with the SSBs in a slot, a first search space for the physical control channel associated with the first SSB;

an SSB detection step 232': performing detection for the candidate SSB set in the candidate transmission time window; and a receiving step 233': determining, based on the positions of SSBs and positions of first search spaces for physical control channels associated with the SSBs in a slot, a candidate first search space group for physical control channels associated with the detected candidate SSB set; determining the first search space for the physical control channel associated with the first SSB and the candidate first search space group for the physical control channels associated with the detected candidate SSB set as search spaces for the physical control channel associated with the first SSB; and receiving, in a slot in which the search spaces for the physical control channel associated with the first SSB are located, the system information scheduled by the physical control channel associated with the first SSB.

In this embodiment of this disclosure, first, the candidate SSB set quasi co-located with the detected first SSB is determined based on the detected first SSB; then detection is performed for candidate SSBs in a position of the determined candidate SSB set; first search spaces for physical control channels associated with the detected candidate SSBs are determined; the first search space for the physical control channel associated with the first SSB and the detected first search space group for the physical control channels associated with the candidate SSB set are determined as the search space for the physical control channel associated with the first SSB; and the system information scheduled by the physical control channel associated with the first SSB is received in the slot in which the search space for the physical control channel associated with the first SSB is located.

In some embodiments of this disclosure, the SSB detection step 232' may include:

performing detection for the candidate SSB set in the candidate transmission time window in order of time; and if a candidate SSB is detected in the candidate transmission time window but no candidate SSB is detected in a next candidate position of a candidate SSB, stopping detection in the current candidate transmission time window, and going to the receiving step.

Generally, in the candidate transmission time window, SSBs are sent in continuous slots. In other words, when detection of the candidate SSB set is performed in the candidate transmission time window, if a candidate SSB is detected in the candidate transmission time window, but no candidate SSB is detected in a next candidate position of a candidate SSB, it is considered that sending of the SSBs in the candidate transmission time window has ended. In this case, detection of the candidate SSB set in the candidate transmission time window is ended, so that overheads of the terminal are reduced.

In some embodiments of this disclosure, after the receiving step 233', the method further includes:

a decoding step 234': combining and decoding the received system information; and if the decoding succeeds, obtaining the system information; or if the decoding fails, buffering the received system information, and performing detection for the candidate SSB set in a next candidate transmission time window and performing the receiving step 233' and the decoding step 234', until the decoding succeeds.

In some embodiments of this disclosure, the receiving system information scheduled by a physical control channel associated with the first SSB includes: performing rate matching (rate matching) on SSBs in a slot in which the system information is located, that is, receiving, in a non-SSB position, the system information scheduled by the physical control channel.

In some embodiments of this disclosure, if measurement of the first SSB is configured for the terminal for radio link monitoring or radio resource management, the foregoing step 23 (the performing radio link monitoring or performing radio resource management measurement) includes:

Step 231": Perform detection for the candidate SSB set in the candidate transmission time window in order of time.

Step 232": If a first number of candidate SSB sets are detected, perform radio link monitoring or perform radio resource management measurement.

Step 233": Otherwise, continue to perform the step of performing detection for the candidate SSB set in a next candidate transmission time window, until the first number of candidate SSB sets are detected.

In some embodiments of this disclosure, the first number is less than or equal to X/q, where X is the maximum number of successive SSBs transmitted in the candidate transmission time window, and q is the quasi co-location factor for SSBs in the candidate transmission time window.

In the foregoing embodiment of this disclosure, the candidate SSB set quasi co-located with the first SSB is all candidate SSB sets quasi co-located with the first SSB in the candidate transmission time window set.

Figure 5:
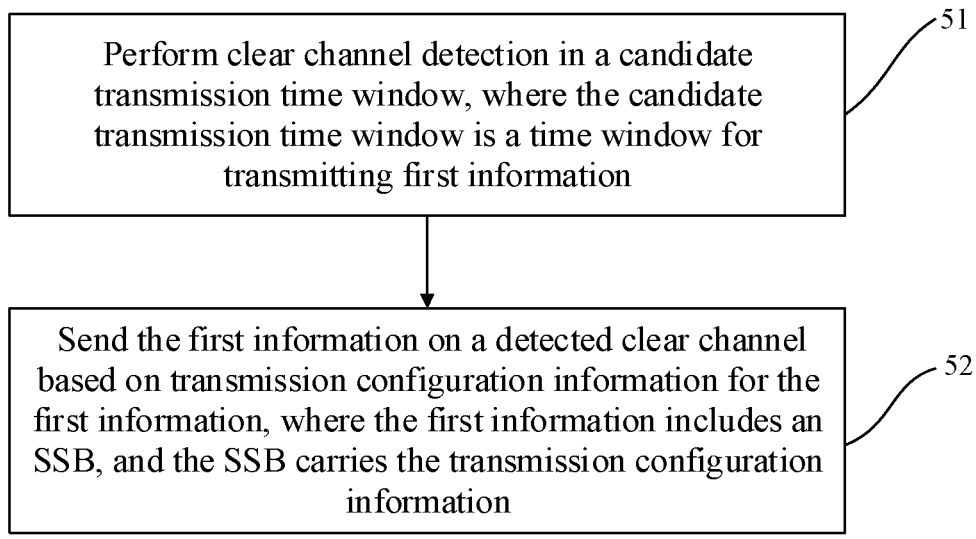
FIG. 5 is a schematic flowchart of an information sending method according to an embodiment of this disclosure.

FIG. 5 is a schematic flowchart of an information sending method according to an embodiment of this disclosure. The method is applied to a network-side device and includes the following steps.

Step 51: Perform clear channel detection in a candidate transmission time window, where the candidate transmission time window is a time window for transmitting first information.

Step 52: Send the first information on a detected clear channel based on transmission configuration information for the first information, where the first information includes an SSB, and the SSB carries the transmission configuration information.

In this embodiment of this disclosure, when sending the SSB, the network-side device may use the SSB to carry the transmission configuration information for the first information; and based on the transmission configuration information, a terminal may receive system information scheduled by a physical control channel associated with the detected SSB, or perform radio link monitoring, or perform radio resource management measurement. Because the configuration information may be carried by the SSB, a search space for the physical control channel associated with the SSB can be configured flexibly.

In some embodiments, the first information further includes the physical control channel associated with the SSB and the system information scheduled by the physical control channel. The terminal may receive, based on the first information, the system information scheduled by the physical control channel associated with a first SSB.

In this embodiment of this disclosure, a search space for a physical control channel, configured by using an SSB and located in a same slot as the SSB, is referred to as a first search space for the physical control channel associated with the SSB.

A first search space for a physical control channel associated with a detected first SSB and a first search space for a physical control channel associated with a detected candidate SSB are collectively referred to as a search space for a physical control channel associated with the first SSB.

In this embodiment of this disclosure, the physical control channel may be a type 0 PDCCH.

The method in this embodiment of this disclosure may be applied to an unlicensed communications system.

In this embodiment of this disclosure, the transmission configuration information includes at least one of the following:

information 1: positions of SSBs and positions of first search spaces for physical control channels associated with the SSBs in a slot;

information 2: the number n of search spaces for physical control channels in one slot, where n is a positive integer greater than or equal to 1;

information 3: a period T of the candidate transmission time window;

information 4: a length L of the candidate transmission time window;

information 5: a quasi co-location factor q for SSBs in the candidate transmission time window; and information 6: the number and/or positions of SSBs sent in one slot.

In this embodiment of this disclosure, the information 1 (positions of SSBs and positions of first search spaces for physical control channels associated with the SSBs in a slot) may be carried by the first SSB, or may be prescribed by a protocol.

Optionally, q may be the maximum number of SSBs not having a quasi co-location relationship in the candidate transmission time window.

In this embodiment of this disclosure, the information 2 (the number n of first search spaces for physical control channels in one slot) may be carried by the first SSB. Therefore, different values of n may be configured based on different situations. Optionally, the value of n may be 1 or 2.

In this embodiment of this disclosure, the number n of search spaces for physical control channels in one slot in the information 2 may be determined by a size of the system information block. If the size of the system information is less than a threshold, two search spaces for physical control channels may be configured in one slot. Referring to FIG. 3, in the embodiment shown in FIG. 3, two search spaces 200 for physical control channels are configured in one slot (for example, symbols 0-13). In this case, the network-side device may perform clear channel detection in the candidate transmission time window based on a monitoring granularity of 0.5 slot (7 symbols) (that is, there is one Listen Before Talk (LBT) opportunity on every seven symbols). If the size of the system information is greater than a threshold, one search space for a physical control channel may be configured in a slot. Referring to FIG. 4, in the embodiment shown in FIG. 4, one search space 200 for a physical control channel is configured in one slot (for example, symbols 0-13). In this case, the network-side device may perform clear channel detection in the candidate transmission time window based on a monitoring granularity of 1 slot (14 symbols) (that is, there is one LBT opportunity on every 14 symbols).

In this embodiment of this disclosure, the information 3 (a period T of the candidate transmission time window) may be prescribed by a protocol, or may be carried by the first SSB, and when the information 3 is carried by the first SSB, different values of T may be configured based on different situations.

In this embodiment of this disclosure, the information 4 (a length L of the candidate transmission time window) may be prescribed by a protocol, or may be carried by the first SSB, and when the information 4 is carried by the first SSB, different values of L may be configured based on different situations.

In this embodiment of this disclosure, the information 5 may be carried by the first SSB, and therefore, different values of q may be configured based on different situations.

In this embodiment of this disclosure, the information 6 (the number and/or positions of SSBs sent in one slot) may be carried by the first SSB, and therefore may be configured based on different situations. For example, one SSB sent in one slot is configured, or two SSBs sent in one slot are configured. Referring to FIG. 3, in the embodiment shown in FIG. 3, two SSBs are sent in one slot (for example, symbols 0-13).

In this embodiment of this disclosure, optionally, for different frequencies (for example, an FR1 and an FR2), different subcarrier spacings (for example, 30 kHz and 60 kHz), or different maximum numbers (that is, maximum values of SSB indexes) of candidate SSBs, the configuration information may be different.

In this embodiment of this disclosure, the performing clear channel detection in a candidate transmission time window includes:

determining a monitoring granularity of clear channel detection based on the number n of search spaces for physical control channels in one slot; and performing clear channel detection in the candidate transmission time window based on the monitoring granularity.

For example, if n is 1, the monitoring granularity is 1 slot; or if n is 2, the monitoring granularity is 0.5 slot.

In this embodiment of this disclosure, the number n of search spaces for physical control channels in one slot is determined by the size of the system information.

With reference to specific embodiments, the following describes the foregoing information sending method and information receiving method of this disclosure by using examples.

Embodiment 1 of this Disclosure

Assuming that a subcarrier spacing in an unlicensed communications system is 30 kHz, an example of the transmission configuration information for the first information is shown in Table 2:

TABLE 2

| Index (index of configuration information) | Number of search space sets per slot (number n of search spaces per slot) | First symbol index | DRS window period (T) | DRS window duration (L) | QCL number q |
|---|---|---|---|---|---|
| 0 | 1 | 0 | 40 ms | 6 ms | 2 |
| 1 | 2 | {0, if i is even}, {7, if i is odd} | 40 ms | 3 ms | 4 |
| 2 | 1 | 0 | 40 ms | 12 ms | 2 |
| 3 | 2 | {0, if i is even}, {7, if i is odd} | 40 ms | 6 ms | 4 |
| 4 | 1 | 0 | 80 ms | 6 ms | 2 |
| 5 | 2 | {0, if i is even}, {7, if i is odd} | 80 ms | 3 ms | 4 |
| 6 | 1 | 0 | 80 ms | 12 ms | 2 |
| 7 | 2 | {0, if i is even}, {7, if i is odd} | 80 ms | 6 ms | 4 |
| 8 | 1 | 0 | 40 ms | 6 ms | 1 |
| 9 | 2 | {0, if i is even}, {7, if i is odd} | 40 ms | 3 ms | 2 |
| 10 | 1 | 0 | 40 ms | 12 ms | 1 |
| 11 | 2 | {0, if i is even}, {7, if i is odd} | 40 ms | 6 ms | 2 |
| 12 | 1 | 0 | 80 ms | 6 ms | 1 |
| 13 | 2 | {0, if i is even}, {7, if i is odd} | 80 ms | 3 ms | 2 |
| 14 | 1 | 0 | 80 ms | 12 ms | 1 |
| 15 | 2 | {0, if i is even}, {7, if i is odd} | 80 ms | 6 ms | 2 |

The first symbol index in the foregoing Table 2 is the positions of first search spaces for physical control channels associated with the SSBs in one slot (information 1) in the foregoing embodiment.

The number of search space sets per slot is the number n of search spaces for physical control channels in one slot (information 2) in the foregoing embodiment.

The DRS window is the candidate transmission time window in the foregoing embodiment. The DRS window period is the period T of the candidate transmission time window (information 3) in the foregoing embodiment. The DRS window duration is the length L of the candidate transmission time window (information 4) in the foregoing embodiment.

The QCL number q is the quasi co-location factor q for SSBs in the candidate transmission time window (information 5) in the foregoing embodiment.

As can be seen from the foregoing table, when indexes of different transmission configuration information are different, transmission configurations for corresponding first information are at least partially different.

In this embodiment of this disclosure, when sending the first information, the network-side device may make the SSB carry the transmission configuration information or carry only the index of the transmission configuration information. One index represents one set of transmission configuration information.

Figure 6:
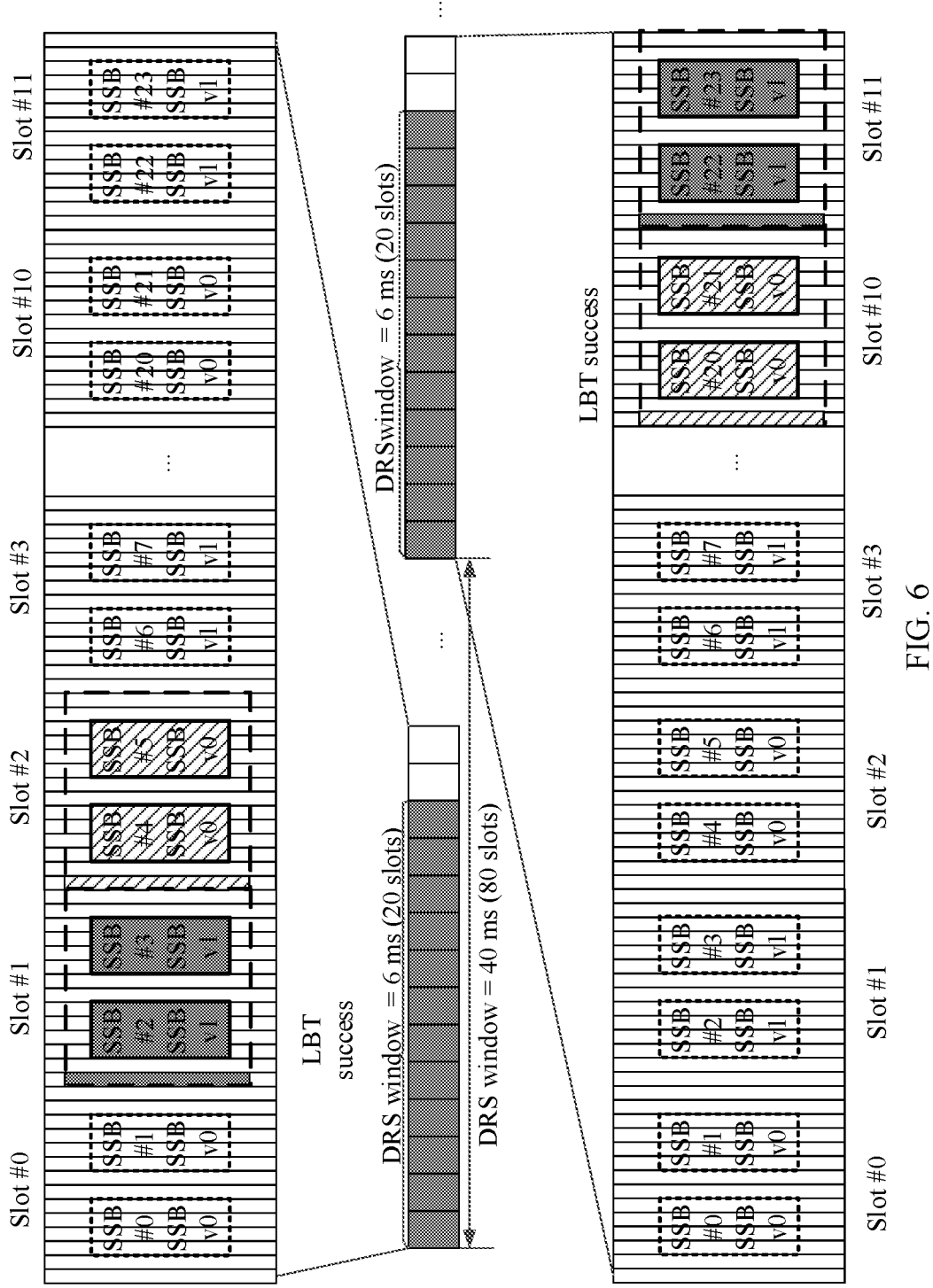
FIG. 6 is a schematic diagram of an information sending mode according to Embodiment 1 of this disclosure.

Referring to FIG. 6, when the network-side device determines to send the first information based on transmission configuration information with an index 0, the network-side device performs clear channel detection in a DRS window (6 ms) based on a monitoring granularity of 1 slot (n is equal to 1). There are 12 (because each slot is 0.5 ms, there are 12 slots in total within 6 ms) LBT transmitting opportunities.

In the embodiment shown in FIG. 6, the network-side device detects a clear channel in the $2^{nd}$ slot (that is, slot #1) of a DRS window and sends the first information (the SSB, a type 0 PDCCH associated with the SSB, and system information scheduled by the type 0 PDCCH) in the $2^{nd}$ slot and the $3^{rd}$ slot (that is, slot #3). The network-side device detects a clear channel in the $11^{th}$ slot (that is, slot #10) of another DRS window and sends the first information in the $11^{th}$ slot and the $12^{th}$ slot (that is, slot #11).

In the embodiment shown in FIG. 6, there are two non-QCLed SSBs in total in one DRS window, that is, SSBv1 and SSBv0, and therefore q=2.

In the embodiment shown in FIG. 6, one type 0 PDCCH is sent in one slot. Two SSBs are sent in one slot.

In the embodiment shown in FIG. 6, when an index of configuration information is 0, an index of a first symbol (that is, a position of a type 0 PDCCH in a slot) is 0, that is, the type 0 PDCCH is located in the first symbol of the slot.

Embodiment 2 of this Disclosure

The configuration information in Table 2 is still used as an example.

Figure 7:
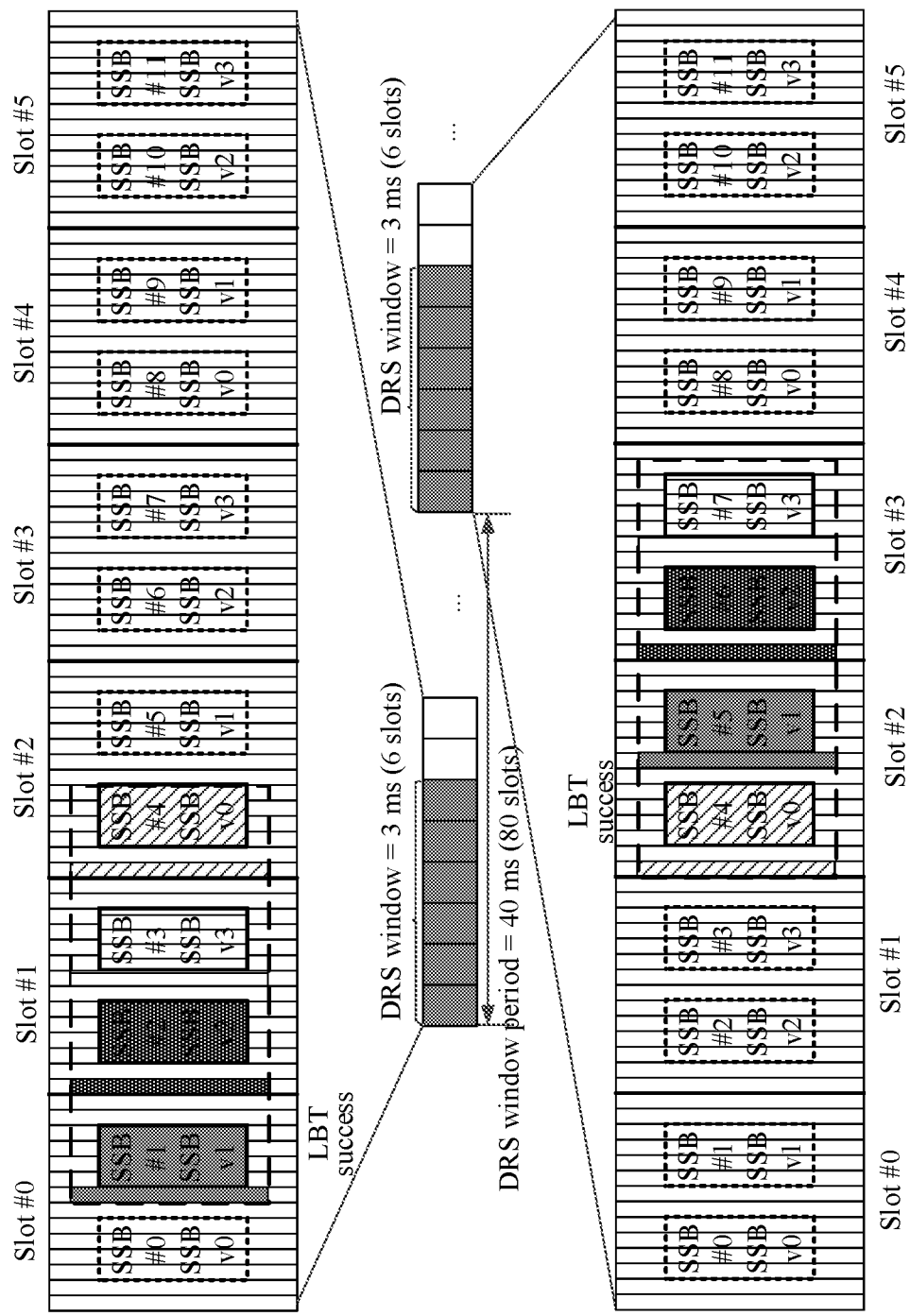
FIG. 7 is a schematic diagram of an information sending mode according to Embodiment 2 of this disclosure.

Referring to FIG. 7, when the network-side device determines to send the first information based on transmission configuration information with an index 1, the network-side device performs clear channel detection in a DRS window (3 ms) based on a monitoring granularity of 0.5 slot. There are 12 (because 0.5 slot is 0.25 ms, there are 12 slots in total within 3 ms) LBT transmitting opportunities.

In the embodiment shown in FIG. 7, the network-side device detects a clear channel in the $1^{st}$ slot (that is, slot #0) of a DRS window and sends the first information (the SSB, a type 0 PDCCH associated with the SSB, and system information scheduled by the type 0 PDCCH) in the $1^{st}$ to $3^{rd}$ slots (that is, slot #0, slot #1, and slot #2). The network-side device detects a clear channel in the $3^{rd}$ slot (that is, slot #2) of another DRS window and sends the first information in the $3^{rd}$ slot and the $4^{th}$ slot (that is, slot #3).

In the embodiment shown in FIG. 7, there are four SSBs not having a QCL relationship in total in one DRS window, that is, SSBv0, SSBv1, SSBv2, and SSBv3, and therefore q=4.

In the embodiment shown in FIG. 7, two type 0 PDCCHs are sent in one slot. Two SSBs are sent in one slot.

In the embodiment shown in FIG. 7, when an index of configuration information is 1, an index of the $1^{st}$ symbol (that is, a position of a type 0 PDCCH in a slot) is {0, if i is even} or {7, if i is odd}. This means, in the $1^{st}$ DRS window, a first search space (Type 0 PDCCH) associated with SSB #1 is located in symbol 7 of the same slot, slot #0, and a type 0 PDCCH associated with SSB #2 is located in symbol 0 of the same slot, slot #1.

Embodiment 3 of this Disclosure

Figure 8:
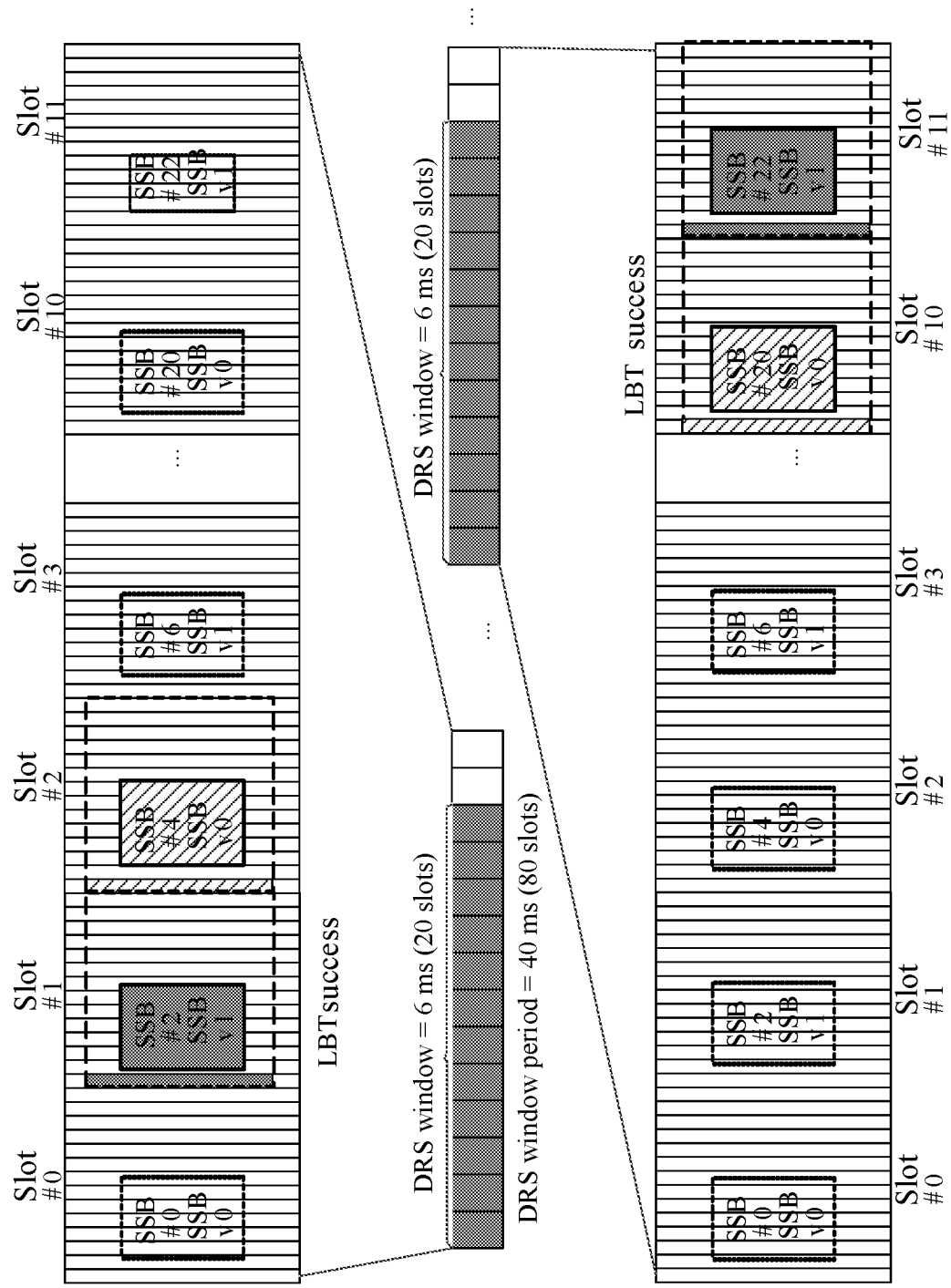
FIG. 8 is a schematic diagram of an information sending mode according to Embodiment 3 of this disclosure.

Referring to FIG. 8, a difference from the embodiment shown in FIG. 6 lies in that in this embodiment, the network-side device configures the information 6, that is, the number and/or positions of SSBs sent in one slot. In the embodiment shown in FIG. 8, one SSB is sent in one slot.

Embodiment 4 of this Disclosure

Figure 9:
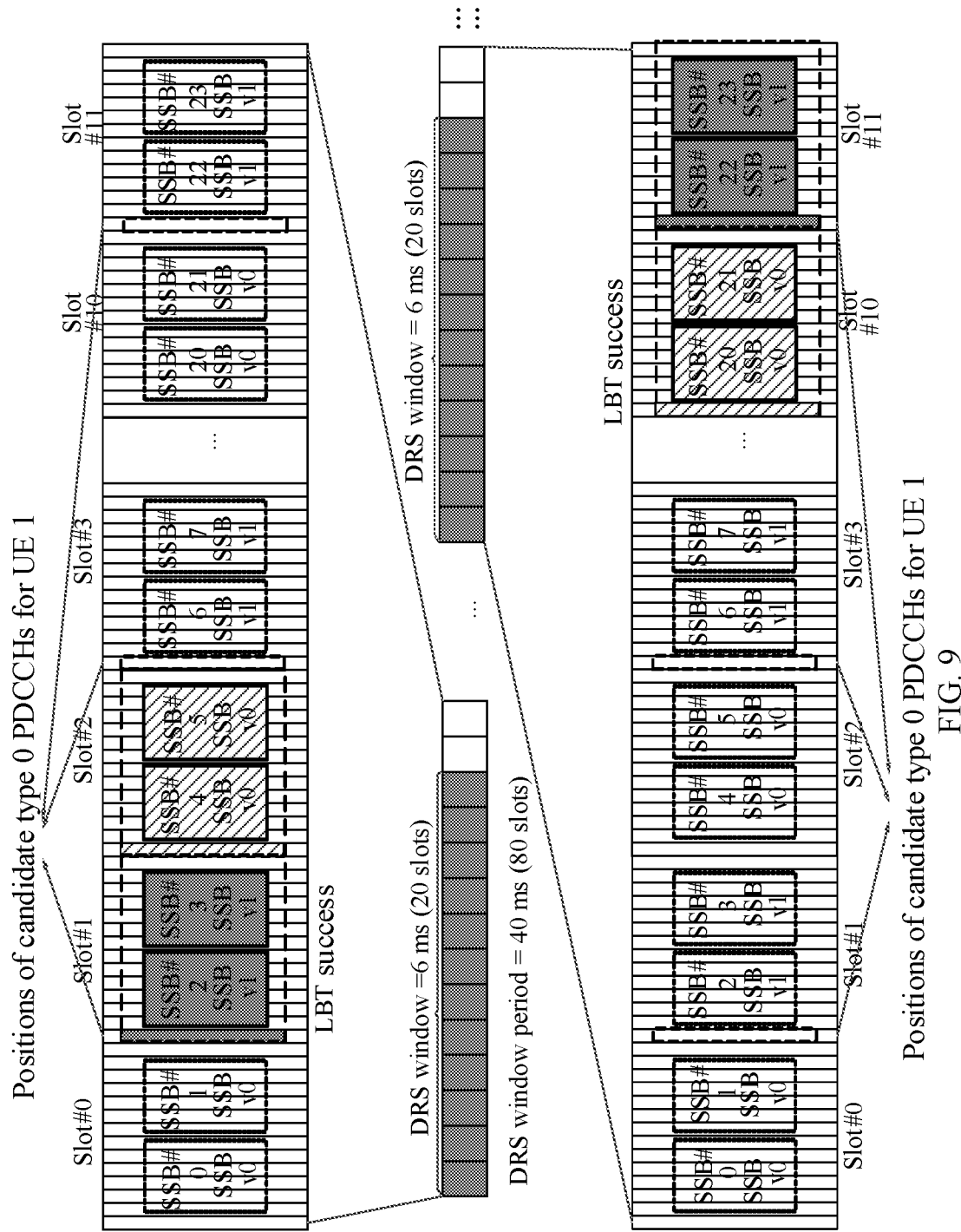
FIG. 9 is a schematic diagram of an information sending mode according to Embodiment 4 of this disclosure.

Referring to FIG. 9, assuming that the network-side device sends the first information based on configuration information with index 0, terminal 1 (UE 1) performs SSB monitoring on a running carrier, detects SSB #2 and SSB #3, and obtains transmission configuration information with index 0 based on the transmission configuration information carried by SSB #2 and SSB #3. In addition, the terminal 1obtains start time of a DRS window based on a monitoring occasion for SSB #2, and may obtain an absolute time window for a DRS based on a period and a length of the DRS window, that is, a gray slot part in FIG. 9. Based on a QCL configuration, positions of candidate type 0 PDCCHs for UE1 may be obtained. When decoding system information, UE1 performs SSS (secondary synchronization signal)/PSS (primary synchronization signal) detection in slots in which the candidate type 0 PDCCHs are located, determines whether the DRS is sent, and if determining that the DRS is present, performs blind detection on the type 0 PDCCH to decode the system information.

Embodiment 5 of this Disclosure

It is assumed that the terminal receives transmission configuration information of the following RLM RS (reference signal), that is, SSB index #2. According to a conventional definition, the terminal only needs to detect a status of SSB-index #2 in each DRS window. In this embodiment of this disclosure, the terminal obtains, based on the configuration information carried by SSB index #2, a series of SSB-index positions that need to be monitored in a DRS occasion, where the positions have a same QCL relationship and are related to table configurations in the embodiment. For example, when the index of the transmission configuration information is 0, the configuration instructs the terminal to monitor candidate positions SSB #2, SSB #3, SSB #6, SSB #7, SSB #10, SSB #11, . . . , SSB #22, and SSB #23. Assuming X=8, the terminal uses a maximum of 8/2=4 SSBs for RLM.

```
RadioLinkMonitoringRS ::=      SEQUENCE {
    radioLinkMonitoringRS-Id       RadioLinkMonitoringRS-Id,
    purpose                        ENUMERATED {beamFailure,
rlf, both},
    detectionResource              CHOICE {
        ssb-Index                      SSB-Index #2,
        csi-RS-Index                   NZP-CSI-RS-ResourceId
    }
```

Figure 10:
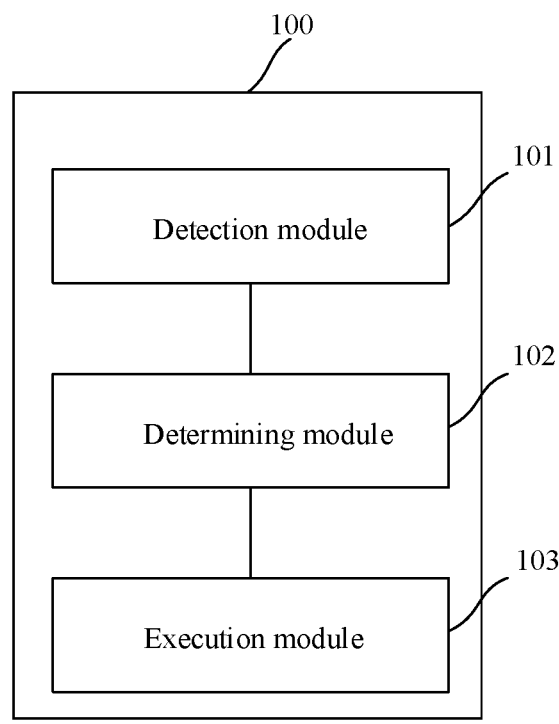
FIG. 10 is a schematic structural diagram of a terminal according to an embodiment of this disclosure.

Based on the same inventive concept, referring to FIG. 10, an embodiment of this disclosure further provides a terminal 100, including:
- a detection module 101, configured to perform SSB detection;
- a determining module 102, configured to determine, based on transmission configuration information for first information, a candidate SSB set quasi co-located with a detected first SSB, where the first information includes an SSB; and
- an execution module 103, configured to perform first processing based on the first SSB and the candidate SSB set, where the first processing includes one of the following:
- receiving system information scheduled by a physical control channel associated with the first SSB;
- performing radio link monitoring; and
- performing radio resource management measurement.

Optionally, the transmission configuration information includes at least one of the following:
- positions of SSBs and positions of first search spaces for physical control channels associated with the SSBs in a slot;
- the number n of search spaces for physical control channels in one slot, where n is a positive integer greater than or equal to 1;
- a period T of a candidate transmission time window;
- a length L of a candidate transmission time window;
- a quasi co-location factor q for SSBs in a candidate transmission time window; or
- the number and/or positions of SSBs sent in one slot, where
- the candidate transmission time window is a time window for transmitting the first information.

Optionally, q may be the maximum number of SSBs not having a quasi co-location relationship in the candidate transmission time window.

Optionally, the transmission configuration information is carried by the first SSB or prescribed by a protocol.

Optionally, the execution module 103 is further configured to: determine a candidate transmission time window set based on the transmission configuration information and an index i of the first SSB, where the candidate transmission time window is the time window for transmitting the first information; and determine, in the candidate transmission time window set, a position of the candidate SSB set quasi co-located with the first SSB.

Optionally, the execution module 103 is further configured to: calculate, based on the index i of the first SSB, a start position to of a candidate transmission time window corresponding to the first SSB; and determine the candidate transmission time window set based on the start position of the candidate transmission time window corresponding to the first SSB, a period T of the candidate transmission time window, and a length L of the candidate transmission time window.

Optionally, the execution module 103 is further configured to: determine an index of the candidate SSB set based on the index i of the first SSB, n, and q; and determine the position of the candidate SSB set in the candidate transmission time window set based on the index of the candidate SSB set.

Optionally, the index $i_0$ of the candidate SSB set satisfies: $\lfloor i*n/2 \rfloor$ mod $q = \lfloor i_0*n/2 \rfloor$ mod $q$.

Optionally, the first information further includes a physical control channel associated with the SSB and system information scheduled by the physical control channel.

Optionally, the execution module 103 is further configured to: determine, based on the positions of SSBs and positions of first search spaces for physical control channels associated with the SSBs in a slot, a first search space for the physical control channel associated with the first SSB, and a candidate first search space group for physical control channels associated with the candidate SSB set; perform detection for the candidate first search space group in a candidate transmission time window set; determine the first search space for the physical control channel associated with the first SSB and the detected candidate first search space group as search spaces for the physical control channel associated with the first SSB; and receive, in a slot in which the search spaces for the physical control channel associated with the first SSB are located, the system information scheduled by the physical control channel associated with the first SSB.

Optionally, the execution module 103 further includes:
- a determining submodule, configured to determine, based on the positions of SSBs and positions of first search spaces for physical control channels associated with the SSBs in a slot, a first search space for the physical control channel associated with the first SSB;

an SSB detection submodule: configured to perform detection for the candidate SSB set in the candidate transmission time window; and a receiving submodule, configured to: determine, based on the positions of SSBs and positions of first search spaces for physical control channels associated with the SSBs in a slot, a candidate first search space group for physical control channels associated with the detected candidate SSB set; determine the first search space for the physical control channel associated with the first SSB and the candidate first search space group for the physical control channels associated with the detected candidate SSB set as search spaces for the physical control channel associated with the first SSB; and receive, in a slot in which the search spaces for the physical control channel associated with the first SSB are located, the system information scheduled by the physical control channel associated with the first SSB.

Optionally, the SSB detection submodule is further configured to: perform detection for the candidate SSB set in the candidate transmission time window in order of time; and if a candidate SSB is detected in the candidate transmission time window but no candidate SSB is detected in a next candidate position of a candidate SSB, stop detection in the current candidate transmission time window.

Optionally, the execution module 103 further includes:
a decoding submodule, configured to: combine and decode the received system information; and if the decoding succeeds, obtain the system information; or if the decoding fails, buffer the received system information, and perform detection for the candidate SSB set in a next candidate transmission time window, where the receiving submodule and the decoding submodule continues processing, until the decoding succeeds.

Optionally, the execution module 103 is specifically configured to: perform detection for the candidate SSB set in the candidate transmission time window in order of time; and if a first number of candidate SSB sets are detected, perform radio link monitoring or perform radio resource management measurement; otherwise continue to perform the step of performing detection for the candidate SSB set in a next candidate transmission time window, until the first number of candidate SSB sets are detected.

Optionally, the first number is less than or equal to X/q, where X is the maximum number of successive SSBs transmitted in the candidate transmission time window, and q is the quasi co-location factor q for SSBs in the candidate transmission time window.

Figure 11:
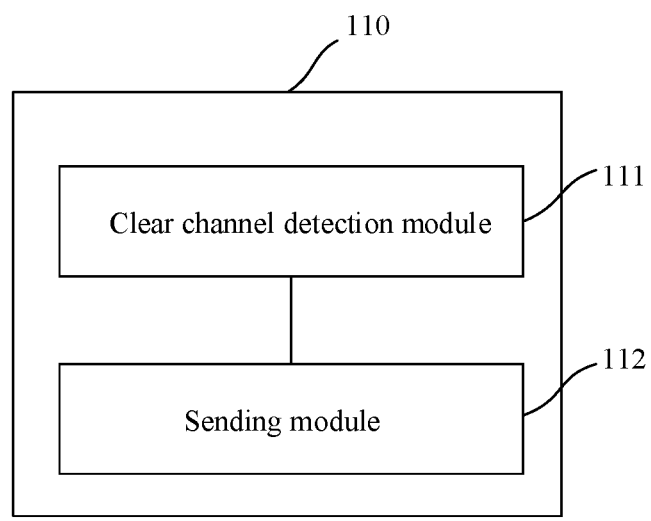
FIG. 11 is a schematic structural diagram of a network-side device according to an embodiment of this disclosure.

Referring to FIG. 11, an embodiment of this disclosure further provides a network-side device 11, including:
a clear channel detection module 111, configured to perform clear channel detection in a candidate transmission time window, where the candidate transmission time window is a time window for transmitting first information; and
a sending module 112, configured to send the first information on a detected clear channel based on transmission configuration information for the first information, where the first information includes an SSB, and the SSB carries the transmission configuration information.

Optionally, the transmission configuration information includes at least one of the following:
positions of SSBs and positions of first search spaces for physical control channels associated with the SSBs in a slot;

the number n of search spaces for physical control channels in one slot, where n is a positive integer greater than or equal to 1;
a period T of the candidate transmission time window;
a length L of the candidate transmission time window;
a quasi co-location factor q for SSBs in the candidate transmission time window; or
the number and/or positions of SSBs sent in one slot.

Optionally, q may be the maximum number of SSBs not having a quasi co-location relationship in the candidate transmission time window.

Optionally, the clear channel detection module 111 is further configured to: determine a monitoring granularity of clear channel detection based on the number n of search spaces for physical control channels in one slot; and
perform clear channel detection in the candidate transmission time window based on the monitoring granularity.

Optionally, the number n of search spaces for physical control channels in one slot is determined by a size of system information.

Figure 12:
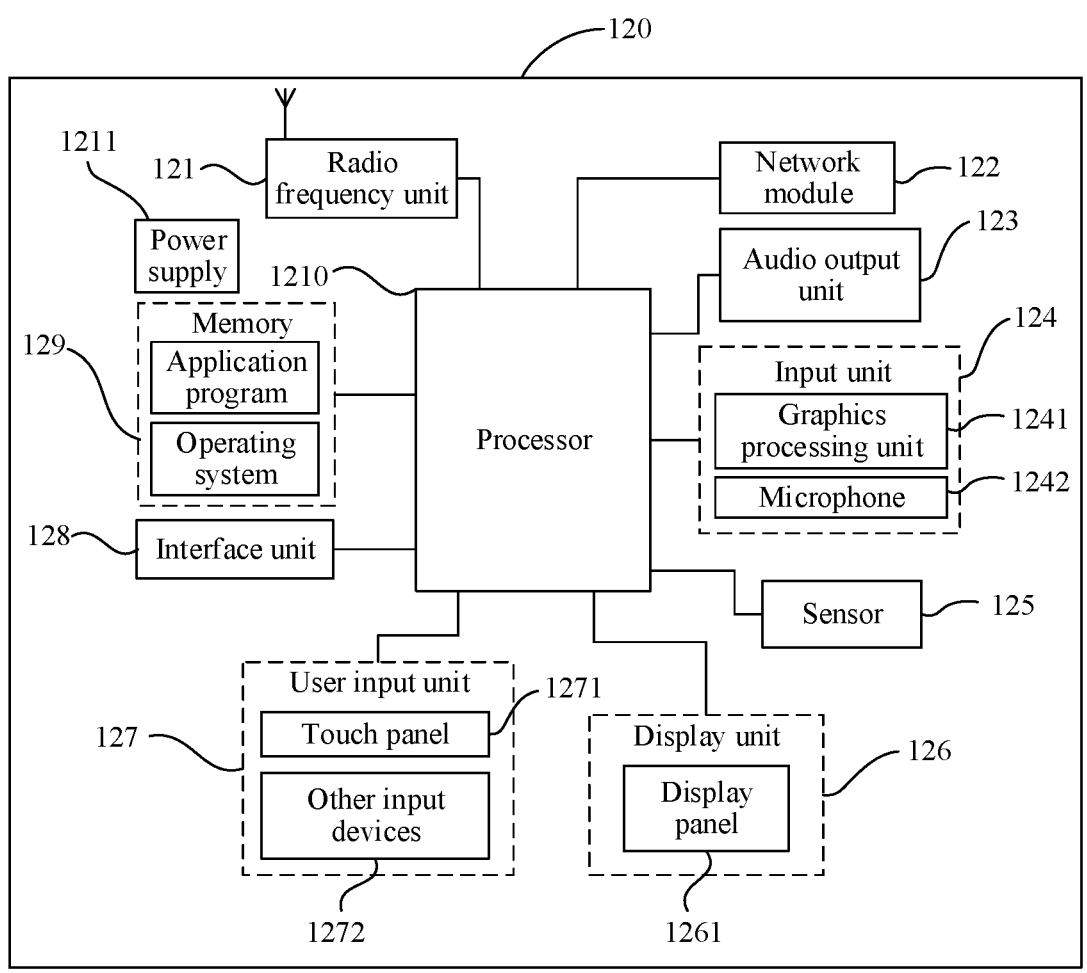
FIG. 12 is a schematic structural diagram of a terminal according to another embodiment of this disclosure.

FIG. 12 is a schematic structural diagram of a terminal according to another embodiment of this disclosure. The terminal 120 includes but is not limited to components such as a radio frequency unit 121, a network module 122, an audio output unit 123, an input unit 124, a sensor 125, a display unit 126, a user input unit 127, an interface unit 128, a memory 129, a processor 1210, and a power supply 1211. A person skilled in the art may understand that the structure of the terminal shown in FIG. 12 does not constitute a limitation on the terminal. A quantity of components included in the terminal may be greater or less than that shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The processor 1210 cooperates with the radio frequency unit 121 and is configured to: perform synchronization signal/physical broadcast channel signal block SSB detection; determine, based on transmission configuration information for first information, a candidate SSB set quasi co-located with a detected first SSB, where the first information includes an SSB; and perform first processing based on the first SSB and the candidate SSB set, where the first processing includes one of the following:
receiving system information scheduled by a physical control channel associated with the first SSB;
performing radio link monitoring; and
performing radio resource management measurement.

It should be understood that in this embodiment of this disclosure, the radio frequency unit 121 may be configured to: receive and transmit signals in an information receiving/transmitting process or a call process; and specifically, after receiving downlink data from a base station, transmit the downlink data to the processor 1210 for processing, and in addition, transmit uplink data to the base station. Generally, the radio frequency unit 121 includes but is not limited to an antenna, at least one amplifier, a transceiver, a coupler, a low noise amplifier, a duplexer, and the like. In addition, the radio frequency unit 121 may further communicate with a network and another device through a wireless communications system.

The terminal provides wireless broadband Internet access for a user by using the network module 122, for example, helps the user send and receive e-mails, browse web pages, and access streaming media.

The audio output unit 123 may convert audio data received by the radio frequency unit 121 or the network module 122 or stored in the memory 129 into an audio signal, and output the audio signal as a sound. In addition, the audio output unit 123 may further provide an audio output (for example, a call signal received sound or a message received sound) related to a specific function performed by the terminal 120. The audio output unit 123 includes a speaker, a buzzer, a telephone receiver, and the like.

The input unit 124 is configured to receive an audio or video signal. The input unit 124 may include a graphics processing unit (GPU) 1241 and a microphone 1242. The graphics processing unit 1241 processes image data of a still picture or a video obtained by an image capture apparatus (for example, a camera) in an image capture mode or a video capture mode. A processed image frame may be displayed on the display unit 126. An image frame processed by the graphics processing unit 1241 may be stored in the memory 129 (or another storage medium) or sent by the radio frequency unit 121 or the network module 122. The microphone 1242 can receive a sound and can process the sound into audio data. The processed audio data can be converted in a telephone call mode into a format that can be sent to a mobile communications base station through the radio frequency unit 121, for outputting.

The terminal 120 further includes at least one sensor 125, for example, an optical sensor, a motion sensor, and another sensor. Specifically, the optical sensor includes an ambient light sensor and a proximity sensor. The ambient light sensor may adjust luminance of a display panel 1261 based on brightness of ambient light. The proximity sensor may turn off the display panel 1261 and/or backlight when the terminal 120 moves to an ear. As a type of motion sensor, an accelerometer sensor can detect magnitudes of accelerations in all directions (usually three axes), can detect a magnitude and a direction of gravity when the terminal is in a stationary state, and can be applied to terminal posture recognition (such as screen switching between portrait and landscape, related games, and magnetometer posture calibration), functions related to vibration recognition (such as pedometer and tapping), and the like. The sensor 125 may further include a fingerprint sensor, a pressure sensor, an iris sensor, a molecular sensor, a gyroscope, a barometer, a hygrometer, a thermometer, an infrared sensor, and the like. Details are not described herein.

The display unit 126 is configured to display information input by the user or information provided for the user. The display unit 126 may include the display panel 1261, and the display panel 1261 may be configured in a form of a liquid crystal display (LCD), an organic light-emitting diode (OLED), or the like.

The user input unit 127 may be configured to receive input digit or character information, and generate a key signal input related to a user setting and function control of the terminal. Specifically, the user input unit 127 includes a touch panel 1271 and other input devices 1272. The touch panel 1271, also referred to as a touchscreen, may capture a touch operation performed by the user on or near the touch panel (for example, an operation performed by the user on the touch panel 1271 or near the touch panel 1271 by using any appropriate object or accessory such as a finger or a stylus). The touch panel 1271 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 1210, and receives and executes a command sent by the processor 1210. In addition, the touch panel 1271 may be implemented in a plurality of forms, for example, a resistive, capacitive, infrared, or surface acoustic wave touch panel. The user input unit 127 may further include the other input devices 1272 in addition to the touch panel 1271. Specifically, the other input devices 1272 may include but are not limited to a physical keyboard, a function key (such as a volume control key or a power on/off key), a trackball, a mouse, a joystick, and the like. Details are not described herein.

Further, the touch panel 1271 may cover the display panel 1261. After the touch panel 1271 detects a touch operation on or near the touch panel, the touch panel 1271 transmits the touch operation to the processor 1210 to determine a type of a touch event. Then the processor 1210 provides a corresponding visual output on the display panel 1261 based on the type of the touch event. Although the touch panel 1271 and the display panel 1261 are used as two independent components to implement input and output functions of the terminal in FIG. 12, the touch panel 1271 and the display panel 1261 may be integrated to implement the input and output functions of the terminal in some embodiments. This is not specifically limited herein.

The interface unit 128 is an interface for connecting an external apparatus to the terminal 120. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 128 may be configured to receive an input (for example, data information and power) from the external apparatus, and transmit the received input to one or more elements in the terminal 120, or may be configured to transmit data between the terminal 120 and the external apparatus.

The memory 129 may be configured to store a software program and various data. The memory 129 may mainly include a program storage area and a data storage area. The program storage area may store an operating system, an application program required for at least one function (such as a sound play function and an image play function), and the like. The data storage area may store data created based on use of the terminal (such as audio data and a phone book), and the like. In addition, the memory 129 may include a high-speed random access memory, or may include a non-volatile memory, for example, at least one magnetic disk storage device, a flash memory, or other non-volatile solid-state storage devices.

The processor 1210 is a control center of the terminal. The processor 1210 uses various interfaces and lines to connect all parts of the entire terminal, and performs various functions and data processing of the terminal by running or executing the software program and/or module stored in the memory 129 and invoking data stored in the memory 129, thereby performing overall monitoring on the terminal. The processor 1210 may include one or more processing units. Optionally, the processor 1210 may integrate an application processor and a modem processor. The application processor mainly processes the operating system, a user interface, an application program, and the like. The modem processor mainly processes wireless communication. It may be understood that the modem processor may alternatively not be integrated into the processor 1210.

The terminal 120 may further include the power supply 1211 (for example, a battery) supplying power to all components. Optionally, the power supply 1211 may be logically connected to the processor 1210 through a power management system. In this way, functions such as charge management, discharge management, and power consumption management are implemented by using the power management system.

In addition, the terminal 120 includes some functional modules that are not illustrated. Details are not described herein.

Figure 13:
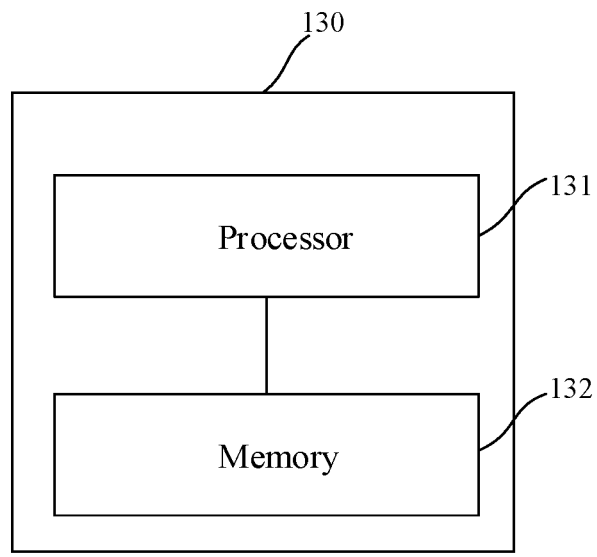
FIG. 13 is a schematic structural diagram of a terminal according to still another embodiment of this disclosure.

FIG. 13 is a schematic structural diagram of a terminal according to still another embodiment of this disclosure. The terminal 130 includes a processor 131 and a memory 132. In this embodiment of this disclosure, the terminal 130 further includes a computer program stored in the memory 132 and capable of running on the processor 131. When the computer program is executed by the processor 131, the following steps are implemented:

performing SSB detection;
determining, based on transmission configuration information for first information, a candidate SSB set quasi co-located with a detected first SSB, where the first information includes an SSB; and
performing first processing based on the first SSB and the candidate SSB set, where the first processing includes one of the following:
receiving system information scheduled by a physical control channel associated with the first SSB;
performing radio link monitoring; and
performing radio resource management measurement.

Optionally, the transmission configuration information for the first information is carried by the first SSB or prescribed by a protocol.

Optionally, the transmission configuration information includes at least one of the following:
positions of SSBs and positions of first search spaces for physical control channels associated with the SSBs in a slot;
the number n of search spaces for physical control channels in one slot, where n is a positive integer greater than or equal to 1;
a period T of a candidate transmission time window;
a length L of a candidate transmission time window;
a quasi co-location factor q for SSBs in a candidate transmission time window; or
the number and/or positions of SSBs sent in one slot,
where
the candidate transmission time window is a time window for transmitting the first information.

Optionally, q may be the maximum number of SSBs not having a quasi co-location relationship in the candidate transmission time window.

Optionally, when the computer program is executed by the processor 131, the following steps can be further implemented:
The determining, based on transmission configuration information for first information, a candidate SSB set quasi co-located with a detected first SSB includes:
determining a candidate transmission time window set based on the transmission configuration information and an index i of the first SSB, where the candidate transmission time window is the time window for transmitting the first information; and
determining, in the candidate transmission time window set, a position of the candidate SSB set quasi co-located with the first SSB.

Optionally, when the computer program is executed by the processor 131, the following steps can be further implemented:
The determining a candidate transmission time window set based on the transmission configuration information and an index i of the first SSB includes:
calculating, based on the index i of the first SSB, a start position to of a candidate transmission time window corresponding to the first SSB; and
determining the candidate transmission time window set based on the start position of the candidate transmission time window corresponding to the first SSB, a period T of the candidate transmission time window, and a length L of the candidate transmission time window.

Optionally, when the computer program is executed by the processor 131, the following steps can be further implemented:
The determining, in the candidate transmission time window set, a position of the candidate SSB set quasi co-located with the first SSB includes:
determining an index of the candidate SSB set based on the index i of the first SSB, n, and q; and
determining the position of the candidate SSB set in the candidate transmission time window set based on the index of the candidate SSB set.

Optionally, the index $i_0$ of the candidate SSB set satisfies: $\lfloor i*n/2 \rfloor \bmod q = \lfloor i_0*n/2 \rfloor \bmod q$.

Optionally, the first information further includes a physical control channel associated with the SSB and system information scheduled by the physical control channel.

Optionally, when the computer program is executed by the processor 131, the following steps can be further implemented:
The receiving system information scheduled by a physical control channel associated with the first SSB includes:
determining, based on the positions of SSBs and positions of first search spaces for physical control channels associated with the SSBs in a slot, a first search space for the physical control channel associated with the first SSB, and a candidate first search space group for physical control channels associated with the candidate SSB set;
performing detection for the candidate first search space group in a candidate transmission time window set;
determining the first search space for the physical control channel associated with the first SSB and the detected candidate first search space group as search spaces for the physical control channel associated with the first SSB; and
receiving, in a slot in which the search spaces for the physical control channel associated with the first SSB are located, the system information scheduled by the physical control channel associated with the first SSB.

Optionally, when the computer program is executed by the processor 131, the following steps can be further implemented:
The receiving system information scheduled by a physical control channel associated with the first SSB includes:
a determining step: determining, based on the positions of SSBs and positions of first search spaces for physical control channels associated with the SSBs in a slot, a first search space for the physical control channel associated with the first SSB;

an SSB detection step: performing detection for the candidate SSB set in the candidate transmission time window; and a receiving step: determining, based on the positions of SSBs and positions of first search spaces for physical control channels associated with the SSBs in a slot, a candidate first search space group for physical control channels associated with the detected candidate SSB set; determining the first search space for the physical control channel associated with the first SSB and the candidate first search space group for the physical control channels associated with the detected candidate SSB set as search spaces for the physical control channel associated with the first SSB; and receiving, in a slot in which the search spaces for the physical control channel associated with the first SSB are located, the system information scheduled by the physical control channel associated with the first SSB.

Optionally, when the computer program is executed by the processor 131, the following steps can be further implemented:

The SSB detection step includes:

performing detection for the candidate SSB set in the candidate transmission time window in order of time; and if a candidate SSB is detected in the candidate transmission time window but no candidate SSB is detected in a next candidate position of a candidate SSB, stopping detection in the current candidate transmission time window, and going to the receiving step.

Optionally, when the computer program is executed by the processor 131, the following steps can be further implemented:

After the receiving step, the method further includes:

a decoding step: combining and decoding the received system information; and if the decoding succeeds, obtaining the system information; or if the decoding fails, buffering the received system information, and performing detection for the candidate SSB set in a next candidate transmission time window and performing the receiving step and the decoding step, until the decoding succeeds.

Optionally, when the computer program is executed by the processor 131, the following steps can be further implemented:

The performing radio link monitoring or performing radio resource management measurement based on the first SSB and the candidate SSB set includes:

performing detection for the candidate SSB set in the candidate transmission time window in order of time; and if a first number of candidate SSB sets are detected, performing radio link monitoring or performing radio resource management measurement; otherwise continuing to perform the step of performing detection for the candidate SSB set in a next candidate transmission time window, until the first number of candidate SSB sets are detected.

Optionally, the first number is less than or equal to X/q, where X is the maximum number of successive SSBs transmitted in the candidate transmission time window, and q is the quasi co-location factor for SSBs in the candidate transmission time window.

Figure 14:
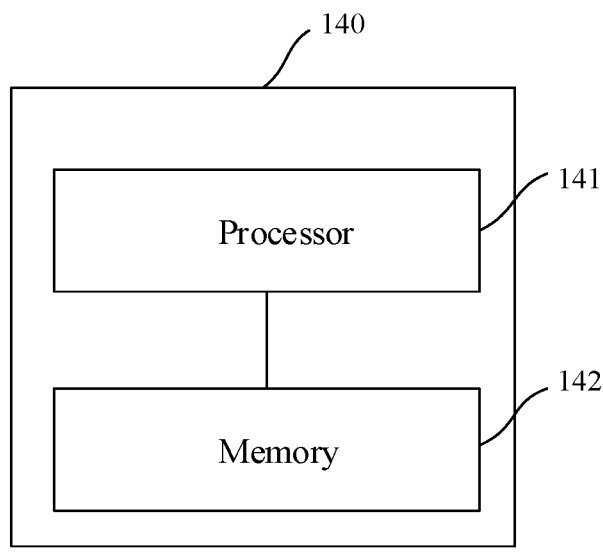
FIG. 14 is a schematic structural diagram of a network-side device according to still another embodiment of this disclosure.

FIG. 14 is a schematic structural diagram of a network-side device according to still another embodiment of this disclosure. The network-side device 140 includes a processor 141 and a memory 142. In this embodiment of this disclosure, the network-side device 140 further includes a computer program stored in the memory 142 and capable of running on the processor 141. When the computer program is executed by the processor 141, the following steps are implemented:

performing clear channel detection in a candidate transmission time window, where the candidate transmission time window is a time window for transmitting first information; and sending the first information on a detected clear channel based on transmission configuration information for the first information, where the first information includes an SSB, and the SSB carries the transmission configuration information.

Optionally, the transmission configuration information includes at least one of the following:

positions of SSBs and positions of first search spaces for physical control channels associated with the SSBs in a slot;

the number n of search spaces for physical control channels in one slot, where n is a positive integer greater than or equal to 1;

a period T of the candidate transmission time window;

a length L of the candidate transmission time window;

a quasi co-location factor q for SSBs in the candidate transmission time window; or the number and/or positions of SSBs sent in one slot.

Optionally, q may be the maximum number of SSBs not having a quasi co-location relationship in the candidate transmission time window.

Optionally, when the computer program is executed by the processor 141, the following steps can be further implemented:

The performing clear channel detection in a candidate transmission time window includes:

determining a monitoring granularity of clear channel detection based on the number n of search spaces for physical control channels in one slot; and performing clear channel detection in the candidate transmission time window based on the monitoring granularity.

Optionally, the number n of search spaces for physical control channels in one slot is determined by a size of system information.

Optionally, the first information further includes a physical control channel associated with the SSB and system information scheduled by the physical control channel.

An embodiment of this disclosure further provides a computer-readable storage medium, where a computer program is stored in the computer-readable storage medium. When the computer program is executed by a processor, each process of the foregoing information receiving method embodiment is implemented, with the same technical effect achieved. To avoid repetition, details are not described again herein.

An embodiment of this disclosure further provides a computer-readable storage medium, where a computer program is stored in the computer-readable storage medium. When the computer program is executed by a processor, each process of the foregoing information sending method embodiment is implemented, with the same technical effect achieved. To avoid repetition, details are not described again herein.

The computer-readable storage medium is, for example, a read-only memory (ROM), a random access memory (RAM), a magnetic disk, or an optical disc.

It should be noted that in this specification, the term "comprising", "including", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

It may be understood that the embodiments described in the embodiments of this disclosure may be implemented by hardware, software, firmware, middleware, microcode, or a combination thereof. For hardware implementation, the processing unit may be implemented in one or more application specific integrated circuits (ASIC), digital signal processors (DSP), digital signal processing devices (DSPD), programmable logic devices (PLD), field-programmable gate arrays (FPGA), general purpose processors, controllers, microcontrollers, microprocessors, and other electronic units for performing the functions described in this disclosure, or a combination thereof.

For software implementation, the technologies described in the embodiments of this disclosure may be implemented by modules (for example, processes or functions) that perform the functions described in the embodiments of this disclosure. Software code may be stored in the memory and executed by the processor. The memory may be implemented in or outside the processor.

According to the description of the foregoing embodiments, a person skilled in the art may clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the protection scope of this disclosure.

What is claimed is:

1. An information receiving method, applied to a terminal, wherein the method comprises:
    performing synchronization signal/physical broadcast channel signal block (SSB) detection;
    determining, based on transmission configuration information for first information, a candidate SSB set quasi co-located with a detected first SSB, wherein the first information comprises a SSB; and
    performing first processing based on the first SSB and the candidate SSB set, wherein the first processing comprises one of the following;
    receiving system information scheduled by a physical control channel associated with the first SSB;
    performing radio link monitoring; and
    performing radio resource management measurement;
    wherein the transmission configuration information comprises at least one of the following:
    positions of SSBs and positions of first search spaces for physical control channels associated with the SSBs in a slot;
    the number n of search spaces for physical control channels in one slot, wherein n is a positive integer greater than or equal to 1;
    a period T of a candidate transmission time window;
    a length L of a candidate transmission time window;
    a quasi co-location factor q for SSBs in a candidate transmission time window; or
    the number and/or positions of SSBs sent in one slot, wherein
    the candidate transmission time window is a time window for transmitting the first information;
    wherein the determining, based or transmission configuration information for first information, a candidate SSB set quasi co-located with a detected first SSB comprises:
    determining a candidate transmission time window set based on the transmission configuration information and an index i of the first SSB; and
    determining, in the candidate transmission time window set, a position of the candidate SSB set quasi co-located the first SSB.

2. The method according to claim 1, wherein the transmission configuration information for the first information is carried by the first SSB or prescribed by a protocol.

3. The method according to claim 1, wherein the determining a candidate transmission time window set based on the transmission configuration information and an index i of the first SSB comprises:
    calculating, based on the index i of the first SSB, a start position to of a candidate transmission time window corresponding to the first SSB; and
    determining the candidate transmission time window set based on the start position of the candidate transmission time window corresponding to the first SSB, a period T of the candidate transmission time window, and a length L of the candidate transmission time window.

4. The method according to claim 1, wherein the determining, in the candidate transmission time window set, a position of the candidate SSB set quasi co-located with the first SSB comprises;
    determining an index of the candidate SSB set based on the index i of the first SSB, n, and q; and
    determining the position of the candidate SSB set in the candidate transmission time window set based on the index of the candidate SSB set.

5. The method according to claim 4, wherein the index is of the candidate SSB set satisfies: $\lfloor i*n/2 \rfloor \bmod q = \lfloor i_o*n/2 \rfloor \bmod q$.

6. The method according to claim 1, wherein the first information further comprises a physical control channel associated with the SSB and system information scheduled by the physical control channel.

7. The method according to claim 6, wherein the receiving system information scheduled by a physical control channel associated with the first SSB comprises:

determining, based on the positions of SSBs and positions of first search spaces for physical control channels associated with the SSBs in a slot, a first search space for the physical control channel associated with the first SSB, and a candidate first search space group for physical control channels associated with the candidate SSB set; and receiving, based on the first search space and the candidate first search space group, the system information scheduled by the physical control channel associated with the first SSB.

8. The method according to claim 7, wherein the receiving, based on the first search space and the candidate first search space group, the system information scheduled by the physical control channel associated with the first SSB comprises:

performing detection for the candidate first search space group in a candidate transmission time window set, wherein the candidate transmission time window is the time window for transmitting the first information;

determining the first search space for the physical control channel associated with the first SSB and the detected candidate first search space group as search spaces for the physical control channel associated with the first SSB; and receiving, in a slot in which the search spaces for the physical control channel associated with the first SSB are located, the system information scheduled by the physical control channel associated with the first SSB.

9. A terminal, comprising a processor, a memory, and a computer program stored in the memory and capable of running on the processor, wherein when the computer program is executed by the processor, the following steps are implemented:

performing synchronization signal/physical broadcast channel signal block (SSB) detection;

determining, based on transmission configuration information for first information, a candidate SSB set quasi co-located with a detected first SSB, wherein the first information comprises a SSB; and performing first processing based on the first SSB and the candidate SSB set, wherein the first processing comprises one of the following:

receiving system information scheduled by a physical control channel associated with the first SSB;

performing radio link monitoring; and performing radio resource management measurement;

wherein the transmission configuration information comprises at least one of the following:

positions of SSBs and positions of first search spaces for physical control channels associated with the SSBs in slot;

the number n of search spaces for physical control channels in one slot, wherein n is a positive integer greater than or equal to 1;

a period T of a candidate transmission time window;

a length L of a candidate transmission time window;

a quasi co-location factor q for SSBs in a candidate transmission time window; or the number and/or positions of SSBs sent in one slot, wherein the candidate transmission time window is a time window for transmitting the first information;

wherein the determining, based on transmission configuration information for first information, a candidate SSB set quasi co-located with a detected first SSB comprises:

determining a candidate transmission time window set based on the transmission configuration information and an index i of the first SSB; and determining, in the candidate transmission time window set, position of the candidate SSB set quasi co-located with the first SSB.

10. The terminal according to claim 9, wherein the transmission configuration information for the first information is carried by the first SSB or prescribed by a protocol.

11. The terminal according to claim 9, wherein the determining a candidate transmission time window set based on the transmission configuration information and an index i of the first SSB comprises:

calculating, based on the index i of the first SSB, a start position to of a candidate transmission time window corresponding to the first SSB; and determining the candidate transmission time window set based on the start position of the candidate transmission time window corresponding to the first SSB, a period T of the candidate transmission time window, and a length L of the candidate transmission time window.

12. The terminal according to claim 9, wherein the determining, in the candidate transmission time window set, a position of the candidate SSB set quasi co-located with the first SSB comprises:

determining an index of the candidate SSB set based on the index i of the first SSB, n, and q; and determining the position of the candidate SSB set in the candidate transmission time window set based on the index of the candidate SSB set.

13. The terminal according to claim 9, wherein the first information further comprises a physical control channel associated with the SSB and system information scheduled by the physical control channel.

14. The terminal according to claim 13, wherein the receiving system information scheduled by a physical control channel associated with the first SSB comprises:

determining, based on the positions of SSBs and positions of first search spaces for physical control channels associated with the SSBs in a slot, a first search space for the physical control channel associated with the first SSB, and a candidate first search space group for physical control channels associated with the candidate SSB set; and receiving, based on the first search space and the candidate first search space group, the system information scheduled by the physical control channel associated with the first SSB.

15. The terminal according to claim 14, wherein the receiving, based on the first search space and the candidate first search space group, the system information scheduled by the physical control channel associated with the first SSB comprises:

performing detection for the candidate first search space group in a candidate transmission time window set, wherein the candidate transmission time window is the time window for transmitting the first information;

determining the first search space for the physical control channel associated with the first SSB and the detected candidate first search space group as search spaces for the physical control Channel associated with the first SSB; and receiving, in a slot in which the search spaces for the physical control channel associated with the first SSB are located, the system information scheduled by the physical control channel associated with the first SSB.

16. A network-side device, comprising a processor, a memory, and a computer program stored in the memory and capable of running on the processor, wherein when the computer program is executed by the processor, the following steps are implemented:

performing clear channel detection in a candidate transmission time window, wherein the candidate transmission time window is a time window for transmitting first information; and sending the first information on a detected clear channel based on transmission configuration information for the first information, wherein the first information comprises synchronization signal/physical broadcast channel signal blocks SSBs, and the SSB carries the transmission configuration information;

wherein the transmission configuration information comprises at least one of the following:

positions of SSBs and positions of first search spaces for physical control channels associated with the SSBs in a slot;

the number n of search spaces for physical control channels in one slot, wherein n is a positive integer greater than or equal to 1;

a period T of a candidate transmission time window;

a length L of a candidate transmission time window;

a quasi co-location factor for SSBs in a candidate transmission time window; or the number and/or positions of SSBs sent in one slot, wherein the candidate transmission time window is a time window for transmitting the first information;

wherein the transmission configuration information causes a terminal to determine a candidate transmission time window set based on an index i of a detected first SSB, and determine, in the candidate transmission time window set, a position of a candidate SSB set quasi co-located with the first SSB.

17. The network-side device according to claim 16, wherein the performing clear channel detection in a candidate transmission time window comprises:

determining a monitoring granularity of clear channel detection based on the number n of search spaces for physical control channels in one slot; and performing clear channel detection in the candidate transmission time window based on the monitoring granularity.

18. The network-side device according to claim 16, wherein the number n of search spaces for physical control channels in one slot is determined by a size of system information.

19. The network-side device according to claim 16, wherein the first information further comprises a physical control channel associated with the SSB and system information scheduled by the physical control channel.

* * * * *